Sept. 29, 1925.  
A. E. OSWALD  
PHONOGRAPH  
Filed July 26, 1921  
1,555,150
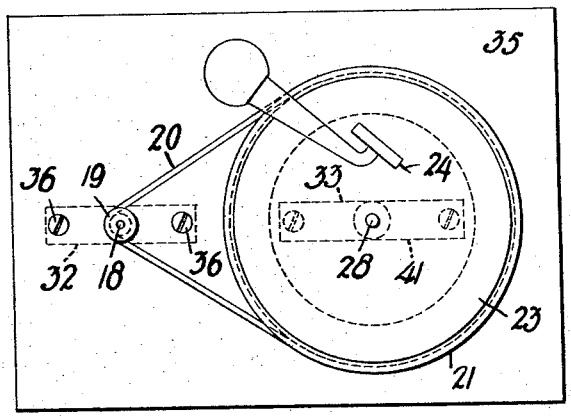
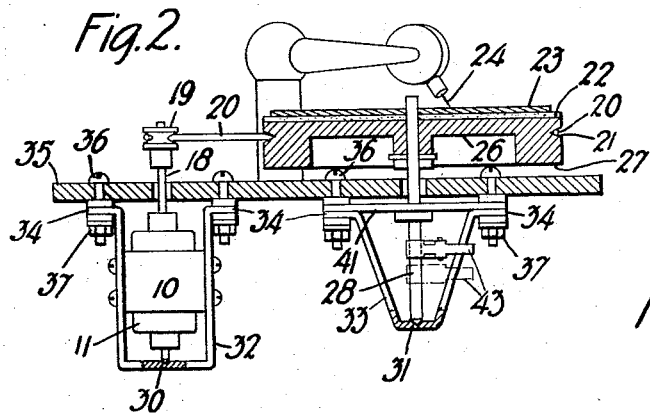
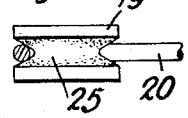
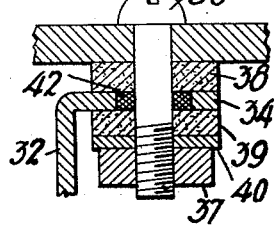
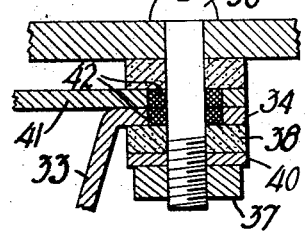
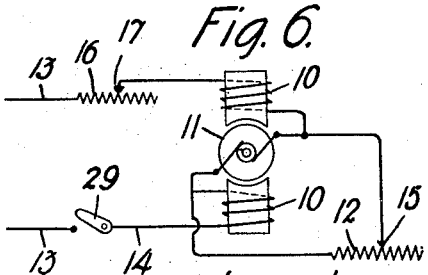
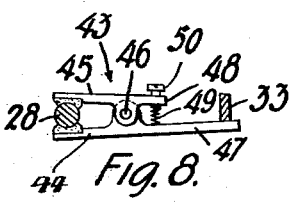
Inventor:  
Alfred E Oswald  
by O.C. Stickney  
Atty Patented Sept. 29, 1925.

1,555,150

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

PHONOGRAPH.

Application filed July 26, 1921. Serial No. 487,699.

*To all whom it may concern:*

Be it known that I, ALFRED E. OSWALD, a citizen of the United States, residing in Bogota, in the county of Bergen and State of New Jersey, have invented certain new and useful Improvements in Phonographs, of which the following is a specification.

This invention relates to phonographs, and particularly to the driving of the record table.

One of the features of the invention resides in an improved connection between the source of power and the table. Heretofore, such connection has been in the form of gearing, which is an objection on account of the expense and noise of operation.

In place of gearing, I employ an endless belt whereby a very small rapidly-revolving pulley is connected to a large pulley or wheel, the latter preferably constituting the record table. Said endless belt preferably consists of a soft rubber band or a plurality of such bands. The soft rubber band is of importance, because no sound can pass along the band from the motor to the table, because of the non-resonant characteristic of the rubber. A second advantage arises from the stretching of the band. The rubber band is relatively thin or slender and weak, so that while untensioned it is unable to rotate the table at the requisite speed. The driving pulley rotates until the band becomes sufficiently taut to rotate the table. The table therefore lags behind the driving pulley. This driving tension or stretching of the rubber band forms a factor in keeping the speed of the table uniform, which is a desideratum in this class of machine, thereby to avoid lowering or raising of the pitch of the music such as would be caused by irregular and undesired fluctuations of the speed of the table. If there should be a momentary or slight increase in the speed of the motor, the band will stretch a little more without instantly or noticeably increasing the speed of the table or raising the pitch of the music. On the other hand, if there should be a momentary slack in the speed of the motor, the band will still continue to pull the table around, since the band has a reservoir of driving power, owing to the tension under which the band acts at all times while driving. The band is long enough to enable it to have sufficient stretch to enable it to continue to pull the table around at substantially its uniform speed, even though there should be such slight momentary weakening on the part of the driving pulley.

These advantages of the soft rubber driving belt are especially brought out when it is used in connection with a weighted record table. Said table is weighted so that its momentum will tend to keep it at uniform speed, thereby avoiding sudden and noticeable fluctuations and consequent disagreeable changes in the pitch of the music. The rubber-band driving belt and the weighted record table coact to keep the pitch uniform through such fluctuations in the speed or torque of the motor as usually occur, and which would otherwise be quite noticeable.

Owing partly to the weighted condition of the table, or table-wheel, the rapidly-revolving driving pulley will stretch the rubber band or belt considerably while the table is gathering headway, and this stretch will be maintained throughout the operation of the machine, with the results above mentioned. Moreover, fluctuations in the speed or torque of the motor can partly be taken up and overcome by the stretching (or by the recovery) of the rubber belt, and partly by the tendency of the weighted table to continue revolving at exactly uniform speed, owing to its over-momentum.

The aforesaid advantages are all especially made available by the use of the herein-described novel electrically-driven high-speed motor, with the result that music of uniform pitch is produced throughout the rendition of a record, and this may be accomplished without the use of ordinary centrifugal governor weights; governor mechanism being objectionable partly because of its delicacy, and partly because of the noise of the gears by which it is driven. By the use of a small rapidly-revolving motor pulley and the weighted record table, with the noiseless rubber band connecting them, and the herein-described motor, a substantially uniform pitch is maintained through fluctuations in the electric current which would otherwise be noticeable and would render the usual electric motor unadapted for driving records.

While certain of the foregoing advantages are available for spring motors, nevertheless it is one of the objects of the present invention to provide an inexpensive, simple and easily regulatable, electrically-driven phonograph to run uniformly at any speed for which it may be regulated, and of such a character that it can be used in a variety of circuits and under substantially all usual conditions, and with regulatable speed, and substantially maintain its speed throughout the operation of the record table; whereby a phonograph with its electric motor may be marketed as a unit for universal use.

Other features and advantages will hereinafter appear.

In the accompanying drawings,

Figure 1 is a plan of the upper part of a phonograph stand or table, showing the record table, the driving pulley and the connecting rubber band.

Figure 2 is a sectional elevation of the same, showing also the motor.

Figures 3 and 4 are details of the sound-deadening connections between the main table and the brackets which carry the revolving parts.

Figure 5 is a detail of the driving pulley.

Figure 6 is a diagram of the constant-speed universal electric motor for maintaining the pitch of the music.

Figure 7 is a diagram to show the driving belt consisting of numerous rubber strains.

Figure 8 is a sectional plan, showing the details of the bracket which may be used upon the record-table shaft.

I place a low-resistance field coil 10 in series with the armature 11, whereby the advantage is preserved of using a relatively small number of windings in the field coil. The difficulty of over-speeding of the motor I overcome by the expedient of connecting a resistance 12 in shunt around the armature. Thus current flowing through the mains 13, 14 is divided, part going through the armature and part through the resistance. A substantial current passes from the line through the field coil 10 independently of the armature, so that the field coil will not become unduly weakened by reason of the counter electromotive force sent into the line by the armature; although the value of the counter electro-motive force determines the amount of current which flows around the armature through said resistance. Hence, when the load is removed from the motor and the latter tends to run faster, there does not occur an over-reduction in the power of the field magnet, and hence the armature can generate the requisite counter electro-motive force without over-speeding. It results that the speed of the motor will not vary to an objectionable extent under variations of load, thus overcoming the objection above noted of over-speeding heretofore found with series field motors.

The armature and said resistance are harnessed, each tending to balance or control the other. For example, if the resistance at 12 were very great, practically all of the current would be forced to go through the armature and the motor would run at a high speed. On the other hand, if the resistance were very little, there would be almost a short-circuiting of the armature and the motor would run at a low speed. Viewed in another way, if the armature develops a great counter electro-motive force, so that there is very little current consumed by the armature, then a greater amount of current will flow through the resistance; whereas, when the motor is running at lowest speed and consuming a maximum of current and developing a minimum counter electro-motive force, then a maximum of current is flowing through the armature and a minimum through the resistance. In every case all current that flows through both the resistance and the armature necessarily passes through the field coil, and the strength of the latter is maintained nearly uniform.

A further feature of the invention is the provision of an adjustment at 15 of the resistance 12 in the shunt circuit, whereby the speed of rotation of the motor and hence the record table may be varied at will. If an adjustment is made so as to include but a little resistance, the current will flow almost entirely through the shunt, so that only a feeble current will pass through the armature. On the other hand, if adjustment is made to include a great resistance in the shunt, the current will be forced to pass mainly through the armature, thereby developing correspondingly strong torque. By this means, the speed of the record may be regulated, and adjustment is afforded to meet the various conditions.

Another feature of the invention is the provision of an adjustable resistance 16, 17 in the main, in series with the armature and field magnets, in combination with the shunt resistance 12, 15 above explained. By means of this line resistance 16, 17, regulation may be effected of the current entering the motor, which current divides between the armature and the shunt resistance, but all of its passes through the field coil, whereby the record-driving motor may be adjusted to meet the requirements of a great variety of circuits. It will be seen that the outside rheostat 16, 17 controls the amount of current consumed by the motor, while the shunt rheostat 12, 15 may control the current consumed by the armature and thereby control the armature speed and that of the table. Moreover, this is done without substantially varying the current which passes through the field 10.

The motor is adjustable to constant speed whether operated on direct current or alternating current. The adjustable resistance 12 in parallel with the armature is for adjusting to the desired constant speed over a wide range. The adjustable resistance 16 is in series with the motor, so that the motor can run on any voltage, either alternating current or direct current. The current through the resistance 12 is not always the same, because the voltage across the armature varies with the speed.

One resistance unit 16, 17 is in series with the complete motor circuit, and permits the use of the motor over a great range in voltage, say from 250 volts to 50 volts, to maintain a constant current. The other resistance unit 12, 15 is in parallel or shunt with the armature and maintains a constant speed.

It will be understood that all armatures of series motors have a counter electro-motive force, due to the armature windings cutting the magnetic field, resulting in the motor consuming less current as the armature increases in speed. Since the armature 11, field 10 and resistance 16 are always in series, it follows that only a certain amount of current for consumption can flow as a maximum. It will also be borne in mind that as the series motor armature increases in speed and the current from the main tends to decrease, then more of the current from the main will be diverted to the resistance 12 in parallel or shunt with the armature, and the amount of current diverted to such resistance 12 will increase as the counter electro-motive force increases. Inasmuch, however, as the maximum amount of current is limited, as heretofore stated, the motor will reach a certain speed, at which point the value of the counter electro-motive force is such that the division of the current between the armature 11 and its paralleled resistance 12 balances, and the armature cannot receive extra current in order to run faster. The field magnet strength at 10 remains nearly the same all the time, and does not substantially decrease, as is the case with a straight series motor.

When the motor is to be run only on alternating current, the efficiency of the motor can be increased by substituting a suitable reactance in place of each of the resistances.

Viewing the motor in one way, it will be perceived that increase of resistance in the shunt during the operation of the motor will have the effect of diverting more of the incoming current through the armature, whereby the speed of the latter will tend to increase. Owing to such increase of speed, a greater counter electro-motive force will be developed; and, since this would oppose the line current, the latter would then in turn be more diverted through the shunt resistance. Accordingly, when the shunt resistance is increased, there is a corresponding increase of voltage across the armature at both shunt and armature. The voltage is the same in any case at both shunt and armature at any one moment. It will thus be seen that adjustment of the shunt resistance effects a variation in the voltage through the armature and consequent variation in the flow of current through the armature. In this way, the desired speed of rotation can be secured, which is a great advantage in driving phonographs.

The motor shaft 18 may be disposed vertically and carry at its upper end a drive pulley 19 connected by an extensible highly elastic endless belt 20, preferably of vulcanized pure or soft rubber, with a pulley or wheel 21 of relatively great diameter, and carrying a table 22, on the usual cushion of which is placed a record disk 23 of the phonograph, the latter having a needle 24 to rest upon the record.

The belt groove 25 of the pulley 19, Figure 5, is preferably roughened, so that the soft rubber driving belt may not slip. Said belt may consist either of a single large band, as shown, or a plurality of smaller bands, 19ª, Figure 7, each running around both pulleys.

The record table 22 may rest upon an overweight metal disk 26, which may form part of the pulley 21. Said table 22 and pulley or wheel 21 may be further overweighted by means of a heavy annular metal portion 27, the whole mounted upon a vertical spindle 28.

In order to operate the phonograph, a switch 29 in the main 14 is closed, thereby starting the motor; adjustment being made at 17 to such an extent as may be rendered necessary by the voltage of the current. The pulley 19, if the parts are made of the proportions shown, will make about three revolutions, thereby tensioning one reach or span of the driving belt 20, before the overweighted disk wheel 26 will begin to revolve. The motor and overweighted record wheel will promptly reach the requisite speed, fine regulation of which may be secured by the adjustment at 15. The driving belt 20 may be approximately $\frac{1}{16}$ of an inch in diameter, and should be of precisely the correct length. It must not be too tight, and yet it should be (when idle) sufficiently loose or elastic to enable it always to be under a certain tension when driving, such as produced by revolving the pulley about three times while the record wheel remains stationary, as already explained; this lead of the driving pulley being preserved throughout the entire performance of the record, since the tension initially effected by the pulley is maintained while operating. Slight variations in the speed of the motor, due to fluctuation in the line voltage at 13, may be taken up and given out by the tensioned rubber belt; and this compensation, together with the tendency of the heavily overweighted record table to run at uniform speed, is sufficient to compensate for considerable voltage fluctuation in the line, as well as for slight variations in the work to be performed by the disk table 22 in vibrating the needle 24.

The pitch of the music is determined by the adjustment 15, and a constant speed of the disk table at the rate determined by adjustment 15 is assured, because of the provision of the shunt resistance around the armature, for reasons above given; so that the record maintains a constant unfluctuating speed, this being accomplished by inexpensive means, without the necessity of providing a delicate centrifugal governing mechanism, and without incurring the noise arising from the operation of such governing mechanism. On the other hand, the communication of noise from the motor to the disk table is avoided, while the construction is simple, and the usual trains of gears may be eliminated. The motor is constructed to operate at a constant speed at any of the various points to which it may be regulated, and this constant speed will be maintained for either alternating current or direct current circuit, and is adjustable over a wide range.

The pulley 19, especially if made of metal, may be wrapped or wound with a thin cotton string, making a facing on the pulley groove, as indicated diagrammatically at Figure 5. This insures against slipping of the rubber belt, and is desirable in order to secure constant speed of the overweighted record table, especially when the motor is connected to a supply line that has inferior regulation of voltage. If the voltage does fluctuate, then of course the motor has a slight tendency to increase and retard its speed in proportion, but since the driving portion or span of the rubber belt 20 is always under tension, (while the other span is relatively loose), it acts as a give-and-take device or equalizer, and this construction, with the overweighted record table, is of value in overcoming such fluctuation in the line voltage.

The driving pulley 19 may be approximately ⅝ of an inch in diameter, while the record table 22 may be about eleven inches in diameter, and rotate about 80 revolutions per minute, the motor having a speed of about 1400 revolutions per minute more or less, this being adjusted to a point to accord with the record that is being played.

The table or wheel 26, 27 may be an alloy of lead to give overweighting and serve as a powerful fly wheel. The shafts 18 and 28 may be supported upon ball-bearings, or other anti-friction devices, which, for example, may be of the pin-point or ball-point type, as at 30, 31, these shafts resting in steps formed in the lower portions of brackets 32, 33, to the former of which is secured the field magnet 10 of the motor.

At their upper ends these brackets may have ears 34, to support them upon the main table 35 by means of bolts 36 and nuts 37. Felt washers 38, 39 may be placed above and below the ears 34. The washers 39 may be faced with metal washers 40. The upper portion of the disk spindle 28 may have a bearing in a cross-bar 41 supported on the table 35 by means of the screws 36, which hold up the record table. The perforations in ear 34 and in the ends of the cross-bar 41 may have sound-deadening bushings 42 of soft rubber or other material, Figures 3 and 4. The noise from the moving mechanism, such as the motor and the disk shaft, is absorbed by the felt washers and felt bushings. The invention is adapted for use with any producer, sound-box, etc.

Inasmuch as the driving of the record is but a light task for the motor, there is preferably placed upon the motor an extra load. This may be done for example by applying one or more brakes 43 to one of the shafts, preferably the record-table shaft 28. This braking means is regulatable, inasmuch as more brakes may be added, as desired, to augment the braking effect; or a spring-tensioning screw 50 may be employed. This brake may be so constructed as to provide a substantial extra load, for the purpose of steadying the running of the motor and the parts driven thereby. If the described motor were to operate with only its own bearings and commutator resistance, plus that of a simple record table, then the motor, due to its own construction and connections, would operate at a given constant speed. Now by adding the fixed resistance or load to the shaft of the record table, or by placing an extra load on the motor, it will be seen that the motor speed will drop, and remain constant at the lower rate, such lowered constant speed being accompanied by increased tension in the rubber belt due to the brake load. The speed may be then regulated at 15.

Owing to this extra load, the motor consumes more current in driving the record at the same speed, or, in other words, the speed of the motor is less than it would be if there were no extra load; and this condition tends to steady the running of the motor. Moreover, the greater the load that is being carried by the motor, and the more current consumed thereby, the less is the effect produced by ordinary fluctuations in the line voltage, and hence the more precisely uniform is the speed of the record table, thus minimizing the effect of the fluctuations in the current. Furthermore, owing to the extra load carried by the motor (which may be several times as great as the normal load), the fluctuations in the work done by the record in vibrating the phonograph needle have a much smaller proportion to the total amount of work performed by the motor, so that the motor runs more evenly, or, in other words, so that its uniformity of speed is less affected by the fluctuations in the power required to vibrate the needle.

Owing to inertia, the overweighted record table cannot instantly have its speed increased or decreased. The increased or decreased energy generated by the motor and apparent in the increased or decreased speed of the motor, due to line voltage fluctuation, is absorbed or given out by the elastic highly tensioned rubber belt.

If a variation in the line consists of a rise in voltage, then the temporary increase in the torque of the motor is absorbed by the rubber belt, which increases in tension, inasmuch as the speed of the weighted flywheel of the record table cannot be instantly increased, especially where the brake tends to oppose such increase. This increased tension condition of the belt may exist for quite a period without perceptibly increasing the speed of the record, and in that period the normal voltage of the line will usually be recovered, so that no perceptible change occurs in the speed of the record. If the fluctuation in the line consists of a drop in the voltage, with a corresponding temporary decrease in the speed of the motor, the elastic rubber driving belt, (which, owing to its highly tensioned condition, is a reservoir of energy) tends to shorten or to use up some of its stored energy in driving the record wheel during such temporary decrease in the motor speed; and the weighted record table therefore continues to revolve at uniform speed, this condition persisting usually until the line recovers its normal voltage. For these reasons fluctuations in the line, which usually are short, have no perceptible effect upon the speed of the record table. It also may be said that at this instant the rubber band is under less than the usual driving tension, since some of its energy has thus been used up in maintaining the speed of the table during a drop in the line voltage. Therefore, in subsequently picking up speed, the motor has only its own inertia to overcome, plus the relatively low resistance offered by the partly untensioned rubber band. Moreover, where the brake is placed upon the record-table shaft, the motor, in picking up speed after a drop in the line voltage, does not at once have to overcome the opposition of said brake, so that the resumption of normal speed by the motor is very prompt. The motor, however, is held to its constant speed again just as soon as the rubber belt is given the right tension.

Each brake may for example consist of opposite leather-lined jaws 44 and 45, Figure 8, pivoted together at 46, said jaws having arms 47, 48, and a compression spring 49 between said arms causing the jaws to clasp the shaft and operate as a brake; arm 47 being made long enough to bear against the bracket or frame 33, to restrain the brake from turning with the shaft. The spring-tensioning screw 50 may be used for regulating the brake resistance to the driving power of the motor.

Variations may be resorted to within the scope of the invention, and portions of the improvements may be used without others.

Having thus described my invention, I claim:

1. A noiseless uniform running mechanism for a phonograph comprising an overweighted record support, a rotatable spindle therefor free of noise producing mechanism, a substantially constant speed motor mechanism and noiseless connections between the motor mechanism and record support comprising pulleys and a band connecting them, said band being soft, pliable and elastic to allow and take up slight differences in speed between the motor and record support whereby the pitch of the reproduced sounds are maintained without interposition of a noise producing speed governor.

2. A record table for a phonograph record, an electric motor revolving at approximately uniform speed, and a speed-reducing highly elastic resilient non-slipping constantly tensioned speed-governing connection between the electric motor and the table, said table so overweighted that its momentum keeps the table revolving at pitch-sustaining speed during moderate fluctuations in the speed of the motor.

3. A record table for a phonograph record, said table having a pulley groove, an electric motor having a drive pulley of relatively small diameter, and pitch-sustaining means for said table, comprising an endless overtensioned speed-regulating connection in the form of a multiplicity of highly elastic non-slipping speed-governing rubber bands running around the motor pulley and the table and constantly tensioned, and also comprising an overweight for said table, the momentum of which keeps the table revolving at uniform speed during moderate fluctuations in the driving power.

4. An article of manufacture marketable as a unit for universal use, and comprising an overweighted phonograph table, a driving pulley, a tensionable highly elastic rubber band connecting said pulley to said table, and a pulley-driving electric motor usable for either direct current or alternating current, regulatable to increase or diminish the speed of the phonograph table, and constructed to maintain uniformly any speed to which it is regulated.

5. The combination of a table for a phonograph record, said table mounted to revolve upon a vertical axis, a vertical shaft carrying a pulley, an endless non-slipping constantly tensioned highly elastic rubber speed-governing driving band running on said pulley and said table, and a motor upon said pulley shaft, said table being in the form of an overweight metal disk provided with a belt groove.

6. The combination of a weighted table for a phonograph record, said table mounted to revolve upon a vertical axis, a vertical shaft carrying a pulley, a non-slipping constantly tensioned endless highly elastic speed-governing rubber driving band running on said pulley and said table, and a motor attached to said pulley shaft, said table in the form of a heavy metal disk provided with a belt groove, said disk additionally weighted by an annular metal portion.

7. A rotating mechanism for a phonograph record, comprising an electric motor having a driving pulley, a heavily-weighted record table having a pulley groove, and a tensionable highly elastic rubber band connecting the motor pulley to the record table, said electric motor having adjustable means for compensating for the voltage of the electric current in different circuits, and also having means adjustable at all voltages to regulate the speed of the record table.

8. A phonograph comprising an overweighted table for a record, a driving pulley, a highly elastic band connecting said pulley to said table, and an electric motor for universal use connected to said pulley, said motor comprising an armature coil, an impedance connected so that the main current is always split up between the armature coil and the impedance, whereby the armature and impedance tend to balance or control each other, and a field coil through which flows all the current passing through both the armature coil and the impedance; means being provided to regulate the speed of the record table by varying said impedance.

9. A phonograph comprising a record table, an electric motor, an endless elastic driving band connecting said motor to said table, and a brake for said table which provides a constant extra load for the motor.

10. A phonograph comprising a record table having a large pulley, an electric motor shaft having a small drive pulley, an endless rubber driving band running around said pulleys, and a regulatable constant-pressure brake to augment the load upon said motor.

11. In combination, a record table for a phonograph record, said table so overweighted that its momentum tends to keep the table revolving at pitch-maintaining uniformity of speed during moderate fluctuations in the driving power, an electric motor, a speed-reducing connection between the electric motor and the overweighted table, and a constant-pressure brake for said record table.

12. The combination of a record table for a phonograph record, said table overweighted, an electric motor, a speed-reducing connection between the electric motor and the overweighted table, said connection in the form of a highly elastic rubber driving belt, and a constant-pressure brake for said record table, the overweight, the elastic belt and the brake combining to form a pitch-maintaining means for said table.

13. The combination of a constant-speed electric motor, a heavily overweighted record table, a highly elastic rubber band forming a connection between said motor and said table, adjustable current-controlling means at said motor for regulating the speed of said table, and an adjustable constant-pressure braking means for said table.

14. An article of manufacture marketable as a unit for universal use, and comprising an overweighted phonograph table, a driving pulley, a tensionable highly elastic rubber band connecting said pulley to said table, a pulley-driving electric motor usable for either direct current or alternating current, regulatable to increase or diminish the speed of the phonograph table, and constructed to maintain uniformly the speed to which it is regulated, and a constant-pressure brake to provide an extra load for said motor.

15. The combination of a record driving table, an electric motor, means for taking up slight variations in the speed of the motor due to fluctuation in the line voltage, said means comprising a highly elastic rubber belt between the motor and the phonograph table, said belt being put under high tension by the motor when driving the table, a weighted portion connected to said table to tend to keep its speed uniform, and adjustable means for putting a constant load upon the motor.

ALFRED E. OSWALD